United States Patent
Akutsu et al.

(10) Patent No.: US 10,913,488 B2
(45) Date of Patent: Feb. 9, 2021

(54) STEER-BY-WIRE ELECTRICAL POWER STEERING DEVICE, AND CONTROL METHOD THEREFOR

(71) Applicant: Mitsubishi Electric Corporation, Tokyo (JP)

(72) Inventors: Satoru Akutsu, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 347 days.

(21) Appl. No.: 15/774,368

(22) PCT Filed: Dec. 28, 2015

(86) PCT No.: PCT/JP2015/086498
§ 371 (c)(1),
(2) Date: May 8, 2018

(87) PCT Pub. No.: WO2017/115411
PCT Pub. Date: Jul. 6, 2017

(65) Prior Publication Data
US 2020/0247462 A1 Aug. 6, 2020

(51) Int. Cl.
*B62D 5/04* (2006.01)
*B62D 5/00* (2006.01)
(Continued)

(52) U.S. Cl.
CPC ........... *B62D 5/0484* (2013.01); *B62D 5/003* (2013.01); *B62D 5/006* (2013.01); *B62D 5/0403* (2013.01);
(Continued)

(58) Field of Classification Search
CPC ........ H02P 25/22; H02P 27/06; H02P 29/028; B62D 5/0484; B62D 5/003; B62D 5/0403; B62D 5/006
(Continued)

(56) References Cited

U.S. PATENT DOCUMENTS

2004/0113575 A1 6/2004 Matsuoka et al.
2009/0133956 A1 5/2009 Itoh
(Continued)

FOREIGN PATENT DOCUMENTS

EP 1 511 155 A1 3/2005
JP 2004-201364 A 7/2004
(Continued)

OTHER PUBLICATIONS

Communication dated Jan. 13, 2020, from the China National Intellectual Property Administration in Application No. 201580085387.8.
(Continued)

*Primary Examiner* — Tony H Winner
*Assistant Examiner* — Felicia L. Brittman
(74) *Attorney, Agent, or Firm* — Sughrue Mion, PLLC; Richard C. Turner

(57) ABSTRACT

An electric power steering device of a steer-by-wire type includes: a steering input mechanism, which includes a steering wheel to be operated by a driver; a reaction force motor, which is configured to apply a steering reaction force to the steering wheel; a steering motor, which is configured to output a steering force; a steering mechanism, which is prevented from being mechanically connected to the steering input mechanism, and is configured to steer a steered wheel through the steering force generated by the steering motor; and a drive control device, which is configured to carry out drive control for the steering motor and the
(Continued)

reaction force motor. At least one of the steering motor or the reaction force motor is constructed of a double-winding motor of a double-inverter type in which each of windings is duplexed, and the respective duplexed windings are individually driven by two inverters.

16 Claims, 5 Drawing Sheets

(51) Int. Cl.
*H02P 25/22* (2006.01)
*H02P 27/06* (2006.01)
*H02P 29/028* (2016.01)

(52) U.S. Cl.
CPC .............. *H02P 25/22* (2013.01); *H02P 27/06* (2013.01); *H02P 29/028* (2013.01)

(58) Field of Classification Search
USPC ........................................................ 180/402
See application file for complete search history.

(56) References Cited

U.S. PATENT DOCUMENTS

| | | | |
|---|---|---|---|
| 2011/0156627 A1 | 6/2011 | Nakamura et al. | |
| 2011/0156629 A1 | 6/2011 | Satou et al. | |
| 2017/0120949 A1* | 5/2017 | Sakamaki | B62D 5/005 |
| 2018/0351482 A1* | 12/2018 | Kanazawa | H02P 6/10 |

FOREIGN PATENT DOCUMENTS

| | | | | |
|---|---|---|---|---|
| JP | 2007-331639 A | | 12/2007 | |
| JP | 2009-029284 A | | 2/2009 | |
| JP | 2009-292331 A | | 12/2009 | |
| JP | 2009292331 A | * | 12/2009 | |
| JP | 2015-039256 A | | 2/2015 | |
| JP | 2017043338 A | * | 3/2017 | |

OTHER PUBLICATIONS

Communication dated Dec. 13, 2018 from the European Patent Office in counterpart Application No. 15912077.3.
International Search Report for PCT/JP2015/086498 dated Mar. 1, 2016 [PCT/ISA/210].

* cited by examiner

STEER-BY-WIRE ELECTRICAL POWER STEERING DEVICE, AND CONTROL METHOD THEREFOR

CROSS REFERENCE TO RELATED APPLICATIONS

This application is a National Stage of International Application No. PCT/JP2015/086498 filed Dec. 28, 2015.

TECHNICAL FIELD

The present invention relates to an steer-by-wire electric power steering device, and a method of controlling the steer-by-wire electric power steering device.

BACKGROUND ART

In the related-art electric power steering device of the steer-by-wire type, there is provided a backup clutch configured to mechanically couple a steering wheel of a steering input mechanism and a steering mechanism configured to steer steered wheels to each other when the device fails (for example, refer to Patent Literature 1).

CITATION LIST

Patent Literature

[PTL 1] JP 2009-29284 A (FIG. 1, etc.)

SUMMARY OF INVENTION

Technical Problem

In the related-art electric power steering device of the steer-by-wire type disclosed in Patent Literature 1, there is provided the backup clutch configured to mechanically couple the steering wheel of the steering input mechanism and the steering mechanism configured to steer the steered wheels to each other when the device fails. Therefore, there have been such problems as an increase in size of the device and the like.

The present invention has been made to solve the above-mentioned problems, and therefore has an object to provide an electric power steering device of a steer-by-wire type, which secures safety without a backup clutch, and a method of controlling the electric power steering device of the steer-by-wire type.

Solution to Problem

According to one embodiment of the present invention, there is provided, for example, an electric power steering device of a steer-by-wire type, including: a steering input mechanism, which includes a steering wheel to be operated by a driver; a reaction force motor, which is configured to apply a steering reaction force to the steering wheel; a steering motor, which is configured to output a steering force; a steering mechanism, which is prevented from being mechanically connected to the steering input mechanism, and is configured to steer a steered wheel through the steering force generated by the steering motor; and a drive control device, which is configured to carry out drive control for the steering motor and the reaction force motor, in which at least one of the steering motor or the reaction force motor is constructed of a double-winding motor of a double-inverter type in which each of windings is duplexed, and the respective duplexed windings are individually driven by two inverters.

Advantageous Effects of Invention

According to the present invention, the safety of the electric power steering device of the steer-by-wire type can be secured without a backup clutch.

DESCRIPTION OF EMBODIMENTS

With an electric power steering device of a steer-by-wire type and a method of controlling the electric power steering device of the steer-by-wire type of the present invention, safety of the device can be secured without a backup clutch. Thus, for example, the electric power steering device of a steer-by-wire type is downsized, is light-weighted, is reduced in cost, has smaller assembly man-hour of the device, and has less restriction on layout.

Now, the electric power steering device of the steer-by-wire type and the method of controlling the electric power steering device of the steer-by-wire type according to an embodiment of the present invention are described with reference to the drawings. In each of the figures, the same or corresponding portions are denoted by the same reference symbols, and the overlapping description thereof is omitted.

First Embodiment

Figure 1:
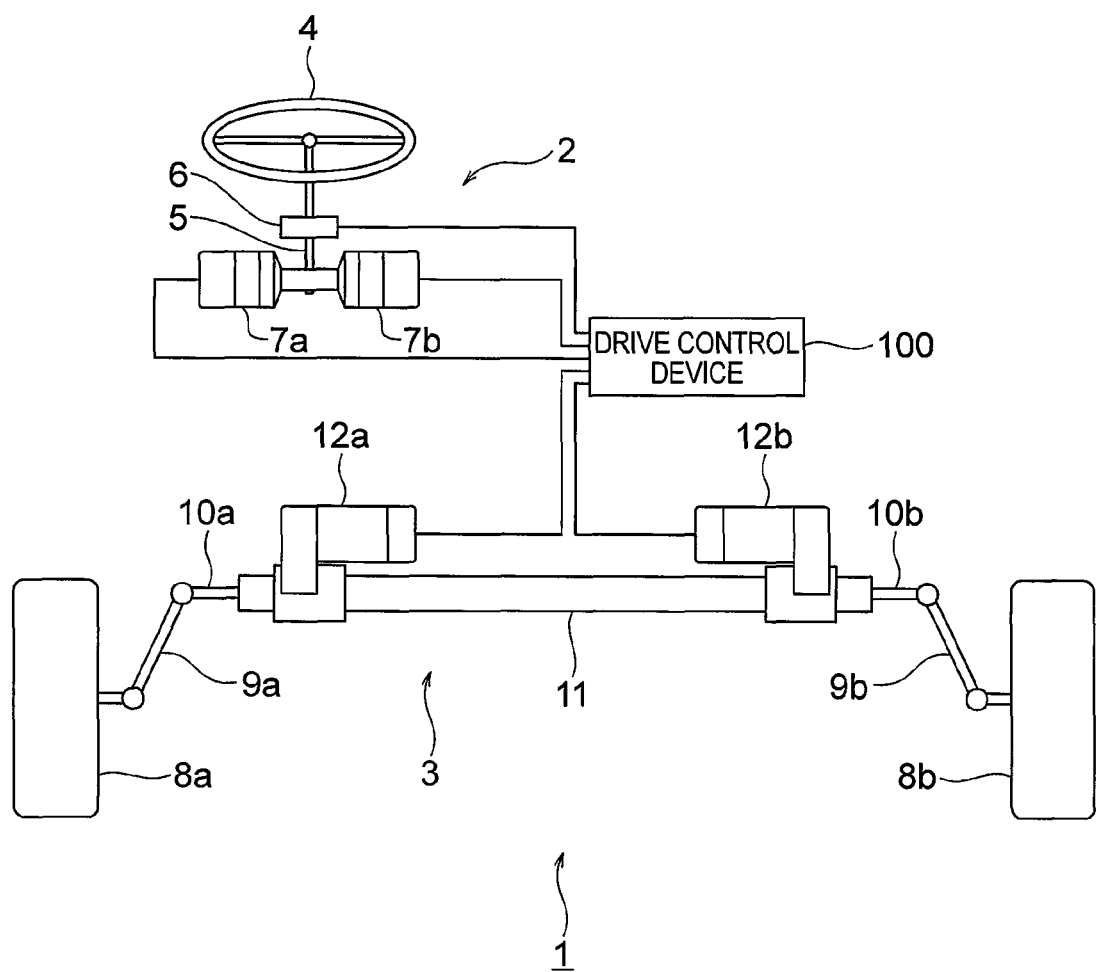
FIG. 1 is a diagram for illustrating an overall configuration of an electric power steering device of a steer-by-wire type of the present invention.

FIG. 1 is a diagram for illustrating an overall configuration of the electric power steering device of the steer-by-wire type of the present invention.

In FIG. 1, a steering shaft 5 is coupled to a steering wheel 4 to be operated by a driver. A steering angle sensor 6, which is configured to detect a steering angle of the driver, and two reaction force motors 7a and 7b, which are provided together and are configured to apply a steering reaction force to the steering by the driver, are mounted to the steering shaft 5. The steering wheel 4, the steering shaft 5, and the steering angle sensor 6 construct a steering input mechanism 2. Tie rods 10a and 10b, which are coupled to a rack shaft 11, are connected to knuckle arms 9a and 9b of front wheels 8*a* and 8*b*, which are steered wheels. The front wheels 8*a* and 8*b* are steered through transmission of a motion of the rack shaft 11 to the front wheels 8*a* and 8*b* via the tie rods 10*a* and 10*b* and the knuckle arms 9*a* and 9*b*. Steering motors 12*a* and 12*b* are mounted to the rack shaft 11. Outputs of the two steering motors 12*a* and 12*b* provided together are used as power for moving the rack shaft 11. The knuckle arms 9*a* and 9*b* and the tie rods 10*a* and 10*b*, which are provided around the rack shaft 11, and the rack shaft 11 construct a steering mechanism 3.

The steering input mechanism 2 and the steering mechanism 3 are not mechanically coupled to each other. There is formed such a configuration that the steering corresponding to the operation of the driver is carried out through appropriate control of the steering motors 12*a* and 12*b* and the reaction force motors 7*a* and 7*b* by a drive control device 100, based on input signals from, for example, the steering angle sensor 6. That is, there is formed an electric power steering device 1 of a so-called steer-by-wire type.

Each of the steering motor 12*a*, the steering motor 12*b*, the reaction force motor 7*a*, and the reaction force motor 7*b* is formed of a three-phase double-winding motor of a double-inverter type including two sets of three-phase windings in which each of the windings is duplexed, and two inverters configured to individually drive the respective two sets of the three-phase windings. The steering motor 12*a*, the steering motor 12*b*, the reaction force motor 7*a*, and the reaction force motor 7*b* are configured to be prevented from completely losing a function as the motor even when a failure occurs.

Figure 2:
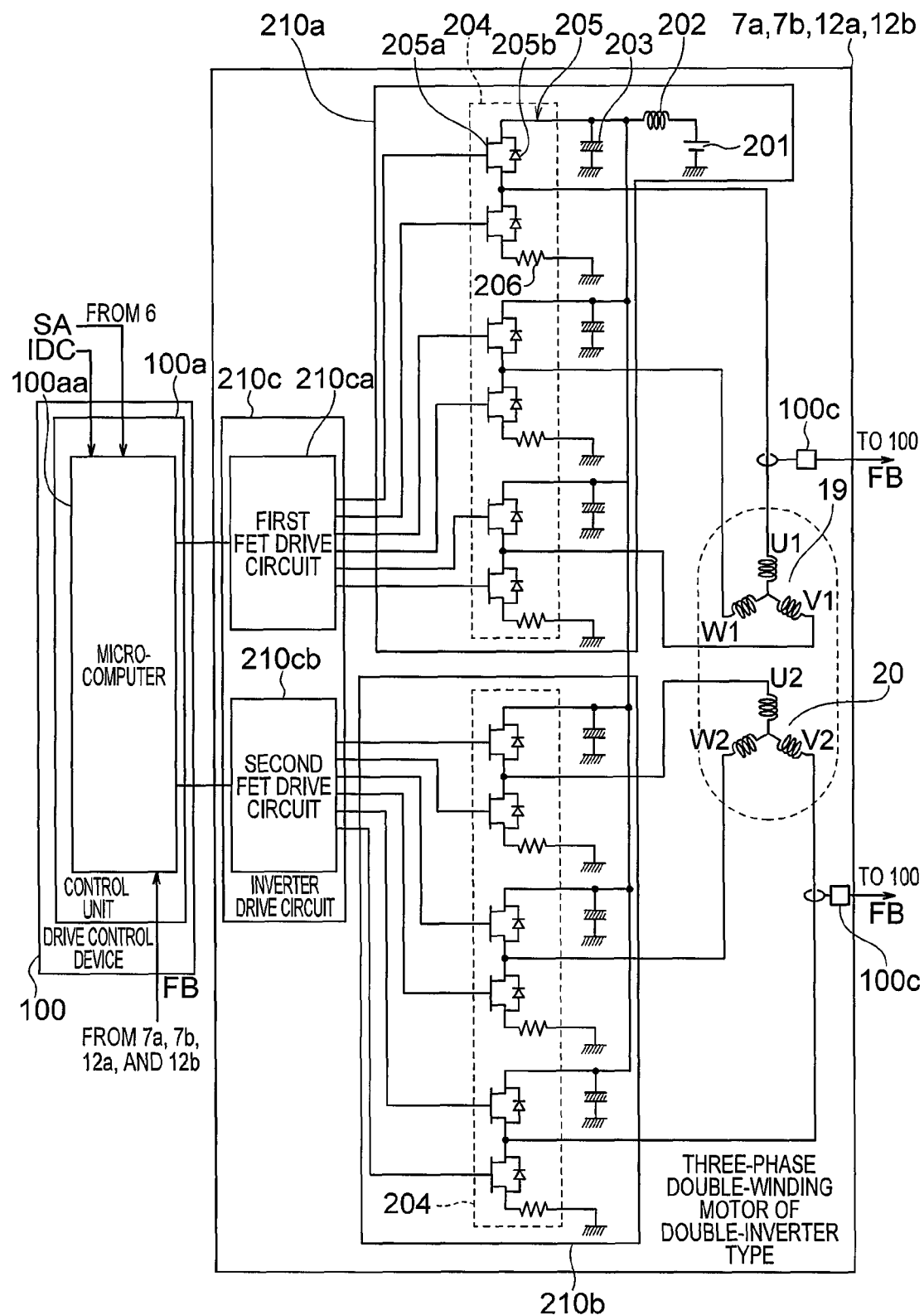
FIG. 2 is a configuration diagram for illustrating a control system for a three-phase double-winding motor of a double-inverter type in the electric power steering device of the steer-by-wire type of the present invention.

A description is now given of a configuration of a control system for the three-phase double-winding motor of the double-inverter type. FIG. 2 is a configuration diagram for illustrating the control system for the three-phase double-winding motor of the double-inverter type in the electric power steering device of the steer-by-wire type of the present invention.

The drive control device 100 includes a control unit 100*a* constructed of, for example, a microcomputer 100*aa*. The microcomputer 100*aa* of the drive control device 100 is configured to output, for example, output drive commands ODC1 and ODC2 for drive control of the three-phase double-winding motor (7*a*, 7*b*, 12*a*, or 12*b*) to an inverter drive circuit 210*c* of each three-phase double-winding motor (7*a*, 7*b*, 12*a*, or 12*b*) in accordance with:

a steering angle signal SA from the steering angle sensor 6;

an input drive command IDC from the outside; and a feedback signal FB from a current detector 100*c*, which is provided to the three-phase double-winding motor (7*a*, 7*b*, 12*a*, or 12*b*), and is configured to detect a phase current and a drive current in order to detect a failure of the motor.

For example, as illustrated in FIG. 2, each of the steering motor 12*a*, the steering motor 12*b*, the reaction force motor 7*a*, and the reaction force motor 7*b*, which is the three-phase double-winding motor of the double-inverter type, includes:

a three-phase winding 19 of a first system and a three-phase winding 20 of a second system, which are duplexed windings;

two inverter circuits 210*a* and 210*b*; and the inverter drive circuit 210*c*, which includes a first FET drive circuit 210*ca* and a second FET drive circuit 210*cb*.

Then, the first FET drive circuit 210*ca* and the inverter circuit 210*a* of the first system construct one inverter, and the second FET drive circuit 210*cb* and the inverter circuit 210*b* of the second system construct another inverter.

In the inverter circuits 210*a* and 210*b*, a parallel capacitor 203, two switching sections 205, which are connected in series, and construct a switching circuit 204, and a shunt resistor 206 are connected in series in common for each of the phases of each of the inverter circuits between the ground and a power supply-side terminal connected to a battery 201, which is a power supply, via a common reactor 202. Each of the switching sections 205 is constructed of a switching device 205*a* formed of, for example, a MOS-FET, and a parasitic diode 205*b* is provided in the FET. A connection point between the switching sections 205 connected in series to each other is connected to each of the windings of the three-phase windings 19 and 20. Moreover, the current detector 100*c* is provided in a connection line connected to the winding to detect a failure through a winding current, and is configured to output the feedback signal FB to the drive control device 100. The current detector 100*c* may be provided for each of the phases or one current detector 100*c* may be provided in common for the three phases in a connection line through which all the phase currents of the three-phase winding flow. Moreover, there may be provided such a configuration that an output of the shunt resistor 206, which is a current detector for current feedback control for the motor, is used for the detection of a failure without providing the dedicated current detector 100*c*.

The first FET drive circuit 201*ca* and the second FET drive circuit 210*cb* of the inverter drive circuit 210*c* are configured to output switching signals for ON/OFF control of the respective switching devices 205*a* of the respective switching sections 205 of the inverter circuits 210*a* and 210*b* of the three-phase double-winding motor (7*a*, 7*b*, 12*a*, or 12*b*) in accordance with the output drive commands ODC1 and ODC2 from the microcomputer 100*aa* of the drive control device 100.

Connection terminals U1, V1, and W1 of the three-phase winding 19 of the first system are connected to the inverter circuit 210*a* of the first system, which is controlled by the microcomputer 100*aa* and the first FET drive circuit 210*ca*. Similarly, connection terminals U2, V2, and W2 of the three-phase winding 20 of the second system are connected to the inverter circuit 210*b* of the second system, which is controlled by the microcomputer 100*aa* and the second FET drive circuit 210*cb*.

Figure 3:
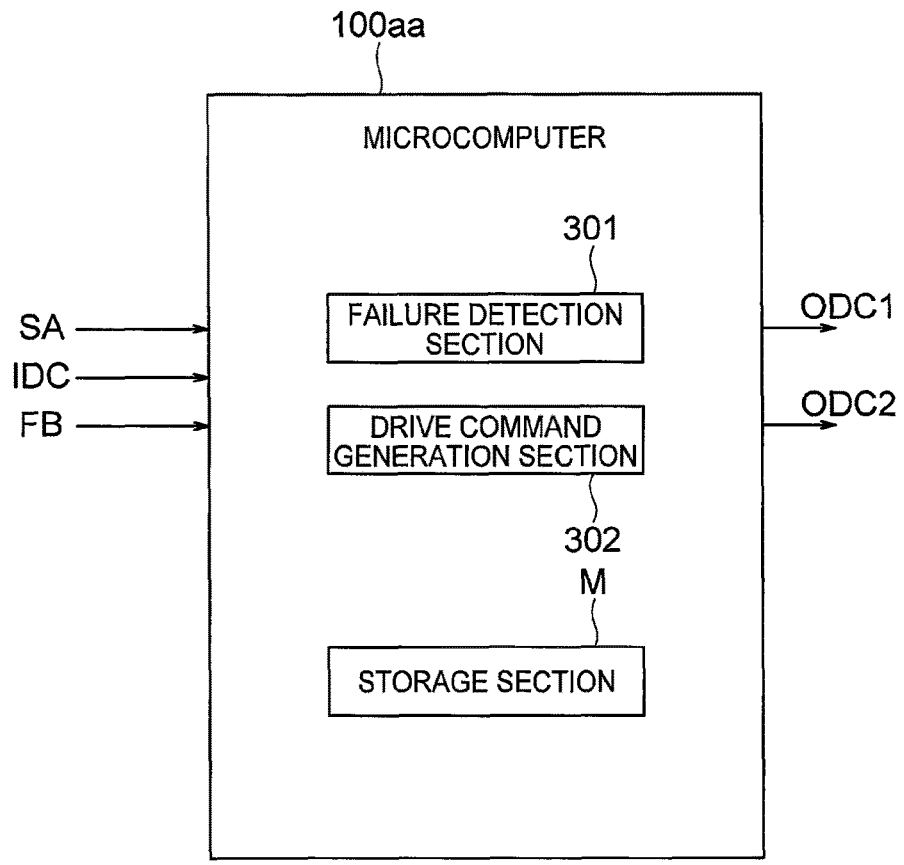
FIG. 3 is a functional block diagram for illustrating an example of a microcomputer of a drive control device of FIG. 2.

FIG. 3 is a functional block diagram for illustrating an example of the microcomputer 100*aa* constructing the control unit 100*a* of the drive control device 100. The microcomputer 100*aa* includes a failure detection section 301, a drive command generation section 302, and a storage section M.

Figure 4:
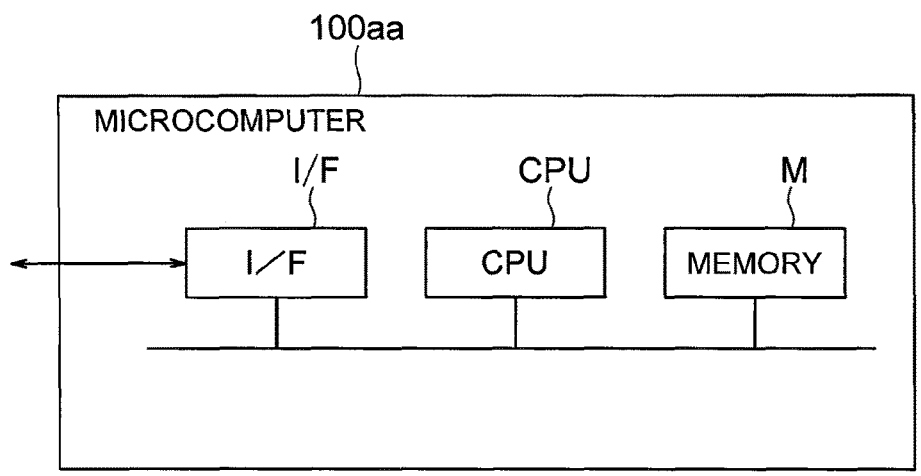
FIG. 4 is a diagram for illustrating an example of a configuration of hardware of the microcomputer of the drive control device of FIG. 2.

Moreover, an example of a configuration of hardware of the microcomputer 100*aa* is illustrated in FIG. 4. The microcomputer 100*aa* is constructed of an interface I/F configured to input/output signals to/from the outside, a memory M configured to store a program for executing functions indicated as the respective functional blocks illustrated in FIG. 3 and various types of data required for processing, and a CPU configured to execute the program stored in the memory M. The storage section M of FIG. 3 indicates the memory M.

Figure 5:
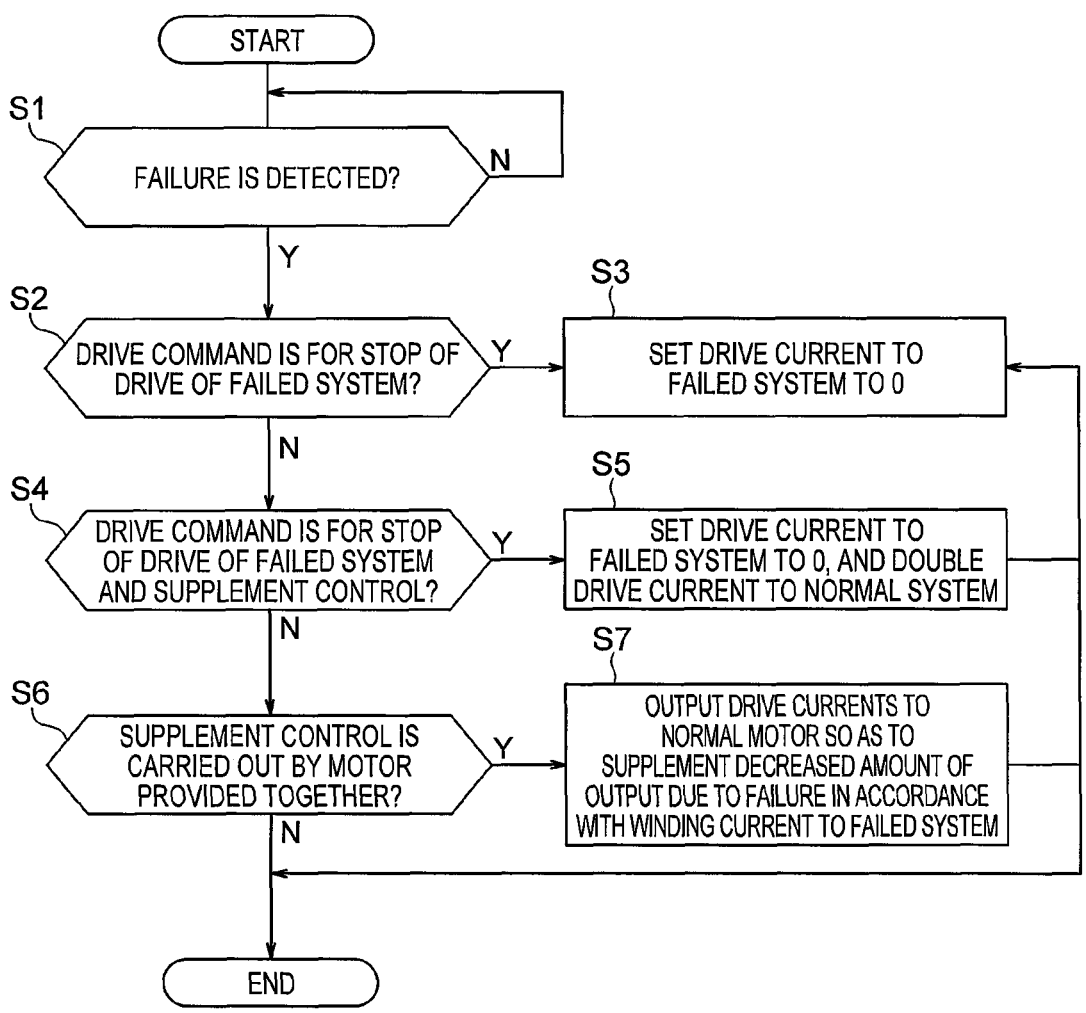
FIG. 5 is an operation flowchart for illustrating an example of a control operation of the microcomputer of the drive control device of FIG. 2 upon a failure of the three-phase double-winding motor of the double-inverter type.

FIG. 5 is an operation flowchart for illustrating an example of a control operation by the microcomputer 100*aa* upon a failure of the three-phase double-winding motor of the double-inverter type, and a description is now given of the operation. A description is given of a case where a failure occurs in the three-phase winding 20 of the second system of the steering motor 12*a* as an example. The failure detection section 301 of the microcomputer 100aa compares a value of the feedback signal FB from the current detector 100c with values in a normal range set in advance, to thereby detect a failure. For example, when the value of the feedback signal FB from the three-phase winding 20 of the second system of the three-phase double-winding motor exceeds or falls below the values in the normal range, the failure detection section 301 detects a failure of the three-phase winding 20 of the second system (Step S1). When such a command that "when a failure occurs, the drive of a failed system of the motor is stopped" is set through, for example, the input drive command IDC from the outside (Step S2), the drive command generation section 302 outputs the output drive command ODC2 of stopping the drive of the second FET drive circuit 210cd. As a result, the drive current to the three-phase winding 20 of the second system becomes zero (Step S3).

Thus, the torque generated by the second system constructed of the second FET drive circuit 201cb and the inverter circuit 210b of the second system of the steering motor 12a becomes zero, and the output torque of the entire motor becomes a half of that of the normal time, but the function is not completely lost, and the steering can be continued.

Moreover, for example, when such a command that "when a failure occurs, the drive of the failed system of the motor is stopped, and supplement control is carried out" is set through, for example, the input drive command IDC from the outside (Step S4), the drive command generation section 302 outputs the output drive command ODC2 of stopping the drive of the second FET drive circuit 210cb, to thereby cause the drive current to the three-phase winding 20 of the second system to become zero. Moreover, simultaneously, the drive command generation section 302 outputs the output drive command ODC1 of increasing the normal drive current to the three-phase winding 19 of the first system by twice as large as that of the normal time. As a result, the torque generated by the first system is doubled (Step S5). The output torque of the entire motor can be the same as an output torque of the normal time by supplementing an amount of the torque generated by the second system through the torque generated by the first system.

Moreover, when such a command that "the supplement control is carried out by the motor provided together" is set through, for example, the input drive command IDC from the outside (Step S6), the drive command generation section 302 outputs the output drive command ODC1 and the output drive command ODC2 respectively to the first FET drive circuit 210ca and the second FET drive circuit 210cb of the inverter drive circuit 210c for the steering motor 12b in accordance with the drive current detected in the failed system, for example, so that the output of the normal steering motor 12b, which is provided together and has not failed, is increased by an amount for supplementing the decreased output in the failed steering motor 12a. As a result, the drive currents for the three-phase winding 19 of the first system and the three-phase winding 20 of the second system are increased in the steering motor 12b by an amount for supplementing the decreased output of the steering motor 12a (Step S7). With the control carried out as described above, the output of the entire device can also be the same as that of the normal time.

In the above-mentioned example, a set condition for the control form upon the occurrence of the failure is determined in accordance with the input drive command IDC from the outside, but the control may be carried out in accordance with a control form upon the occurrence of the failure stored in, for example, the storage section M, namely, the memory M in advance.

The electric power steering device of the steer-by-wire type of the present invention having the configuration described above can maintain its function even when the motor fails, and thus does not require a backup clutch, which has been provided in the related-art device, and is configured to mechanically couple the steering input mechanism and the steering mechanism to each other when the device fails. Accordingly, the electric power steering device of the steer-by-wire type of the present invention is downsized, is light-weighted, is reduced in cost, has smaller assembly man-hour, and has less restriction on a layout.

In the above-mentioned example, a description is given of such a configuration that the number of the steering motors is two, the number of reaction force motors is two, and the three-phase double winding motor of the double-inverter type is applied to all the motors. However, the numbers of the respective motors, and the number of the motors to which the three-phase double-winding motor of the double-inverter type is applied may appropriately be selected in accordance with required safety.

Figure 6:
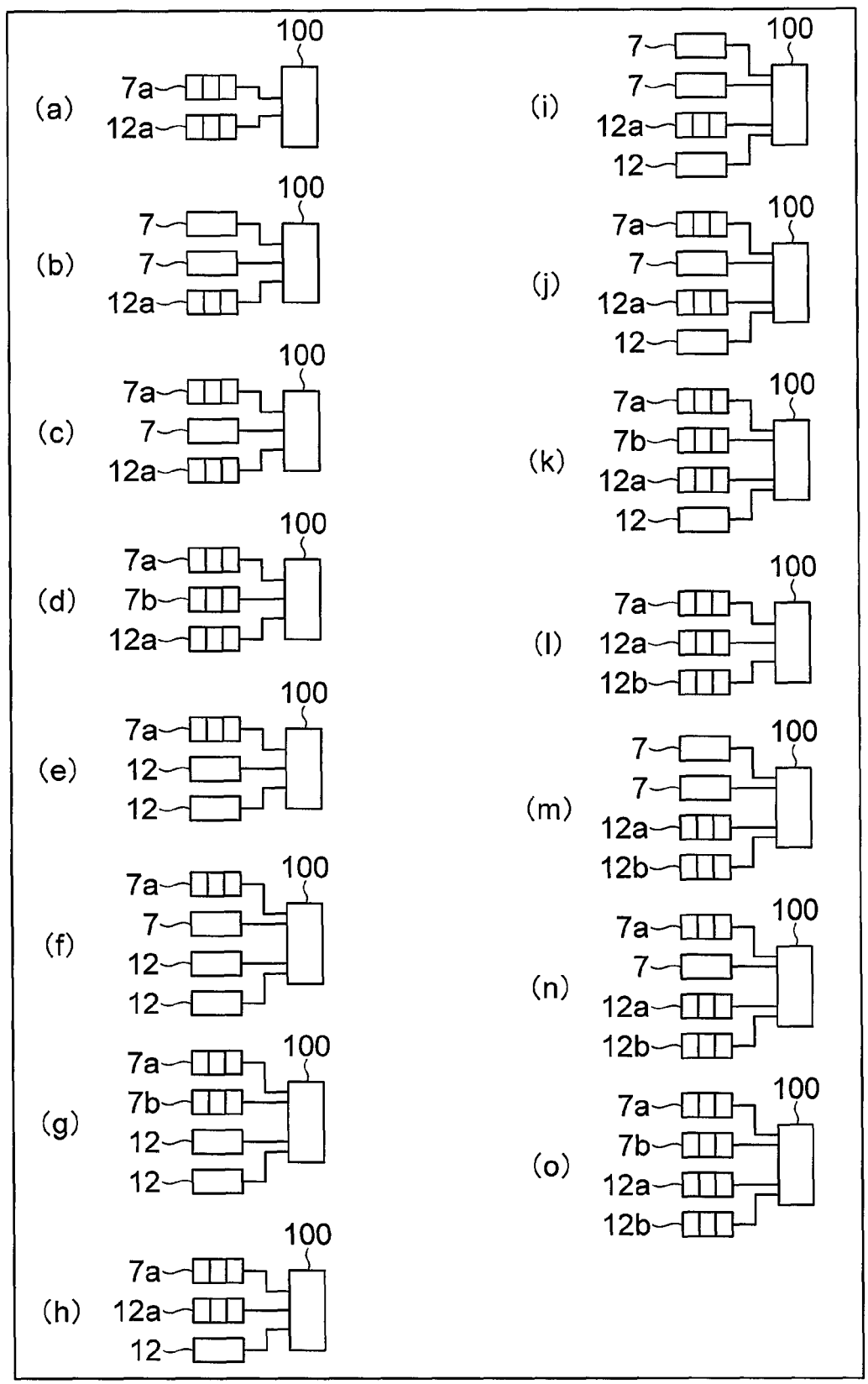
FIG. 6 is a diagram for illustrating configuration examples of motors and the drive control device of the electric power steering device of the steer-by-wire type of the present invention.

For example, there are configurations as indicated by parts (a) to (o) of FIG. 6. In FIG. 6, a reaction force motor constructed of a related-art three-phase single-winding motor of a single-inverter type is denoted by the reference numeral 7, a reaction force motor constructed of the three-phase double-winding motor of the double-inverter type of the present invention is denoted by the reference numeral 7a or 7b, a steering motor constructed of the related-art three-phase single-winding motor of the single-inverter type is denoted by the reference numeral 12, a steering motor constructed of the three-phase double-winding motor of the double-inverter type of the present invention is denoted by the reference numeral 12a or 12b, and the drive control device is denoted by the reference numeral 100.

In the part (a), there is illustrated a configuration example including one steering motor constructed of the "double" steering motor 12a, and one reaction force motor constructed of the "double" reaction force motor 7a.

In the part (b), there is illustrated a configuration example including one steering motor constructed of the "double" steering motor 12a, and two reaction force motors constructed of two "single" reaction force motors 7.

In the part (c), there is illustrated a configuration example including one steering motor constructed of the "double" steering motor 12a, and two reaction force motors constructed of the "single" reaction force motor 7 and the "double" reaction force motor 7a.

In the part (d), there is illustrated a configuration example including one steering motor constructed of the "double" steering motor 12a, and two reaction force motors constructed of two "double" reaction force motors 7a and 7b.

In the part (e), there is illustrated a configuration example including two steering motors constructed of two "single" steering motors 12, and one reaction force motor constructed of the "double" reaction force motor 7a.

In the part (f), there is illustrated a configuration example including two steering motors constructed of two "single" steering motors 12, and two reaction force motors constructed of the "double" reaction force motor 7a and the "single" reaction force motor 7.

In the part (g), there is illustrated a configuration example including two steering motors constructed of two "single" steering motors 12, and two reaction force motors constructed of two "double" reaction force motors 7a and 7b.

In the part (h), there is illustrated a configuration example including two steering motors constructed of the "double" steering motor 12a and the "single" steering motor 12, and one reaction force motor constructed of the "double" reaction force motor 7a.

In the part (i), there is illustrated a configuration example including two steering motors constructed of the "double" steering motor 12a and the "single" steering motor 12, and two reaction force motors constructed of two "single" reaction force motors 7.

In the part (j), there is illustrated a configuration example including two steering motors constructed of the "double" steering motor 12a and the "single" steering motor 12, and two reaction force motors constructed of the "double" reaction force motor 7a and the "single" reaction force motor 7.

In the part (k), there is illustrated a configuration example including two steering motors constructed of the "double" steering motor 12a and the "single" steering motor 12, and two reaction force motors constructed of two "double" reaction force motors 7a and 7b.

In the part (l), there is illustrated a configuration example including two steering motors constructed of two "double" steering motors 12a and 12b, and one reaction force motor constructed of the "double" reaction force motor 7a.

In the part (m), there is illustrated a configuration example including two steering motors constructed of two "double" steering motors 12a and 12b, and two reaction force motors constructed of two "single" reaction force motors 7.

In the part (n), there is illustrated a configuration example including two steering motors constructed of two "double" steering motors 12a and 12b, and two reaction force motors constructed of the "double" reaction force motor 7a and the "single" reaction force motor 7.

In the part (o), there is illustrated a configuration example, which is described in the above-mentioned embodiment, and includes two steering motors constructed of two "double" steering motors 12a and 12b, and two reaction force motors constructed of two "double" reaction force motors 7a and 7b.

Thus, for example, in Step S6 of FIG. 5 through the control by the microcomputer 100aa, when such a command that "the supplement control is carried out by the motor provided together" is set through the input drive command IDC, there may be provided such control that the drive current to the steering motor 12 constructed of the normal related-art three-phase single-winding motor of the single-inverter type, which is provided together, and has not failed, is adjusted. The same holds true for the reaction force motor.

Moreover, in the above-mentioned embodiment, the number of microcomputers as the drive control device is one, but there may be provided such a configuration that one microcomputer is provided for each of the systems. Further, the motor is not limited to the three-phase type, and the present invention can also be applied to an electric power steering device provided with motors of other multi-phase type.

INDUSTRIAL APPLICABILITY

The present invention can be applied to the electric power steering device of the steer-by-wire type for a vehicle in various forms.

The invention claimed is:

1. An electric power steering device comprising:
    a steering input mechanism, which includes a steering wheel to be operated by a driver;
    a reaction force motor, which is configured to apply a steering reaction force to the steering wheel;
    a steering motor, which is configured to output a steering force, and is constructed of a double-winding motor of a double-inverter type in which each of one or more windings is duplexed, and the respective one or more duplexed windings are individually driven by two inverters;
    a steering mechanism, which is mechanically unconnected to the steering input mechanism, and is controlled in accordance with a steering angle of the double-winding motor of the double-inverter type, and is configured to steer a steered wheel through the steering force generated by the steering motor; and
    a drive controller, which is configured to carry out drive control for the steering motor and the reaction force motor.

2. The electric power steering device according to claim 1, wherein the double-winding motor of the double-inverter type comprises a three-phase double-winding motor of the double-inverter type including two sets of three-phase windings and the two inverters configured to individually drive the respective two sets of the three-phase windings.

3. The electric power steering device according to claim 2, wherein the steering motor comprises the three-phase double-winding motor of the double-inverter type.

4. The electric power steering device according to claim 3,
    wherein the steering motor comprised of the three-phase double-winding motor of the double-inverter type includes two steering motors, and
    wherein the two steering motors are provided together.

5. The electric power steering device according to claim 3, wherein, when the drive controller receives a feedback signal indicating a failure from the three-phase double-winding motor of the double-inverter type, in accordance with a set condition, the drive controller controls a drive current to a winding of a failed system out of two systems of the windings of the three-phase double-winding motor, a winding of a non-failed system, or, in a case where another motor is provided together, a winding of the another motor provided together.

6. The electric power steering device according to claim 2, wherein the reaction force motor comprises the three-phase double-winding motor of the double-inverter type.

7. The electric power steering device according to claim 6, wherein, when the drive controller receives a feedback signal indicating a failure from the three-phase double-winding motor of the double-inverter type, in accordance with a set condition, the drive controller controls a drive current to a winding of a failed system out of two systems of the windings of the three-phase double-winding motor, a winding of a non-failed system, or, in a case where another motor is provided together, a winding of the another motor provided together.

8. The electric power steering device according to claim 2, wherein, when the drive controller receives a feedback signal indicating a failure from the three-phase double-winding motor of the double-inverter type, in accordance with a set condition, the drive controller controls a drive current to a winding of a failed system out of two systems of the windings of the three-phase double-winding motor, a winding of a non-failed system, or, in a case where another motor is provided together, a winding of the another motor provided together.

9. The electric power steering device according to claim 1, wherein the double-winding motor of the double-inverter type is a three-phase double-winding motor of the double-inverter type, and
wherein, when the drive controller receives a feedback signal indicating a failure from the three-phase double-winding motor of the double-inverter type, in accordance with a set condition, the drive controller controls a drive current to a winding of a failed system out of two systems of the windings of the three-phase double-winding motor, a winding of a non-failed system, or, in a case where another motor is provided together, a winding of the another motor provided together.

10. An electric power steering device comprising:
a steering input mechanism, which includes a steering wheel to be operated by a driver;
two reaction force motors, which are provided together and configured to apply a steering reaction force to the steering wheel;
a steering motor, which is configured to output a steering force;
a steering mechanism, which is mechanically unconnected to the steering input mechanism, and is configured to steer a steered wheel through the steering force generated by the steering motor; and
a drive controller, which is configured to carry out drive control for the steering motor and the reaction force motors,
wherein each of the two reaction force motors is constructed of a three-phase double-winding motor of a double-inverter type in which each winding is duplexed, and the respective duplexed windings are individually driven by two inverters.

11. An electric power steering device comprising:
a steering input mechanism, which includes a steering wheel to be operated by a driver;
a reaction force motor, which is configured to apply a steering reaction force to the steering wheel;
a steering motor, which is configured to output a steering force;
a steering mechanism, which is mechanically unconnected to the steering input mechanism, and is configured to steer a steered wheel through the steering force generated by the steering motor; and
a drive controller, which is configured to carry out drive control for the steering motor and the reaction force motor,
wherein each of the steering motor and the reaction force motor comprises a three-phase double-winding motor of a double-inverter type in which each of one or more windings is duplexed, and the respective one or more duplexed windings are individually driven by two inverters.

12. The electric power steering device according to claim 11,
wherein the steering motor comprised of the three-phase double-winding motor of the double-inverter type includes two steering motors, and
wherein the two steering motors are provided together.

13. The electric power steering device according to claim 11,
wherein the reaction force motor comprised of the three-phase double-winding motor of the double-inverter type includes two reaction force motors, and
wherein the two reaction force motors are provided together.

14. The electric power steering device according to claim 11,
wherein the steering motor comprised of the three-phase double-winding motor of the double-inverter type includes two steering motors,
wherein the two steering motors are provided together,
wherein the reaction force motor comprised of the three-phase double-winding motor of the double-inverter type includes two reaction force motors, and
wherein the two reaction force motors are provided together.

15. The electric power steering device according to claim 11, wherein, when the drive controller receives a feedback signal indicating a failure from the three-phase double-winding motor of the double-inverter type, in accordance with a set condition, the drive controller controls a drive current to a winding of a failed system out of two systems of the windings of the three-phase double-winding motor, a winding of a non-failed system, or, in a case where another motor is provided together, a winding of the another motor provided together.

16. A method of controlling an electric power steering device, the method comprising:
constructing at least one of a reaction force motor, which is configured to apply a steering reaction force to a steering wheel of a steering input mechanism to be operated by a driver, or a steering motor, which is configured to output a steering force to a steering mechanism that is mechanically unconnected to the steering input mechanism, and is controlled in accordance with a steering angle, of a double-winding motor of a double-inverter type in which each winding is duplexed, and the respective duplexed windings are individually driven by two inverters; and
controlling, when the double-winding motor of the double-inverter type fails, in accordance with a set condition, a drive current to a winding of a failed system out of two systems of the windings of the double-winding motor, a winding of a non-failed system, or, in a case where another motor is provided together, a winding of the another motor provided together.

* * * * *